United States Patent [19]

Megee et al.

[11] Patent Number: 4,679,579

[45] Date of Patent: Jul. 14, 1987

[54] METHOD AND APPARATUS FOR CONTROLLING THE PRESSURE OF GASES FLOWING THROUGH A CONDUIT

[75] Inventors: Bryan A. Megee; James D. Whiteside, II, both of Borger, Tex.

[73] Assignee: Phillips Petroleum Company, Bartlesville, Okla.

[21] Appl. No.: 828,482

[22] Filed: Feb. 12, 1986

[51] Int. Cl.[4] ............................................. G05D 7/00
[52] U.S. Cl. ...................................... 137/13; 137/268
[58] Field of Search ..................... 137/268, 13; 138/89, 138/92, 94, 41

[56] References Cited

U.S. PATENT DOCUMENTS 3,698,474 10/1972 Rowley .......................... 137/268 X
3,926,256 12/1975 McCall ............................ 137/13 X
4,088,155 4/1978 Echtler ................................ 138/41

Primary Examiner—Alan Cohan
Attorney, Agent, or Firm—French and Doescher

[57] ABSTRACT

Method and apparatus for the control of velocity and pressure of hot gases flowing through a conduit wherein generally spherically shaped objects of refractory material are disposed within such conduit during the operation thereof to provide a constriction of the cross-sectional area of the conduit through which the gases are flowing. A particular embodiment of apparatus employed in the present invention comprises a pair of generally spherically shaped refractory objects secured together by means of a length of steel cable.

8 Claims, 3 Drawing Figures

METHOD AND APPARATUS FOR CONTROLLING THE PRESSURE OF GASES FLOWING THROUGH A CONDUIT

The present invention is generally directed to the control of gas flow through a conduit. In one aspect, the present invention is directed to a method of controlling the flow of a stream of gas flowing through a conduit during the flow of the stream of gas through the conduit. In another aspect, the present invention is generally directed to apparatus suitable for use in controlling the flow of hot gases through a conduit during the flow of such hot gases through the conduit.

During the performance of certain industrial processes, such as, for example, the catalytic cracking of hydrocarbons, it is often necessary to adjust the flow rate and pressure drops of hot flue gases during the subsequent treatment of such hot flue gases before they are released to the atmosphere. The handling of such hot flue gases, which are often both corrosive and errosive, requires the use of extremely rugged equipment which can stand up under such hostile operating conditions. Such rugged equipment includes, but is not limited to, heavy-duty mechanically actuated slide valves and fixed baffle plates, such as perforated baffle plates, which extend transversely across the conduit through which the hot flue gases flow. The economics of many such industrial processes require continuous operation of the process equipment over many months without any opportunity to shut down the industrial process for inspection and maintenance purposes.

In the operation of such industrial processes, often the operating parameters, feedstocks, operability of the process equipment, etc. change, thus requiring adjustment of the gas flow velocities and pressure drops through the flue gas conduits. When the existing equipment utilized in controlling the gas flow through such conduits is incapable of making the necessary adjustments necessary for continued successful operation of the industrial process, it would be extremely advantageous to utilize method and apparatus for making such adjustments without shutting down the industrial process. Accordingly, the present invention is directed to method and apparatus for achieving such control and adjustment of high temperature gas flow through a conduit while permitting the continued operation of the process associated with the high temperature gas flow.

Accordingly, it is an object of the present invention to provide a method of adjusting and controlling the continuous flow of hot gases through a conduit.

Another object of the invention is to provide apparatus for controlling and adjusting the flow of hot gases through a conduit.

Yet another object of the present invention is to provide a process for adjusting and controlling the continuous flow of hot gases through a conduit which is simple, safe and economical.

A further object of the present invention is to provide simple, effective and economical apparatus for the control of hot gas flow through a conduit.

Other objects, aspects and advantages of the present invention will be readily apparent to those skilled in the art upon a reading the specification and claims with reference to the drawings in which:

Figure 1:
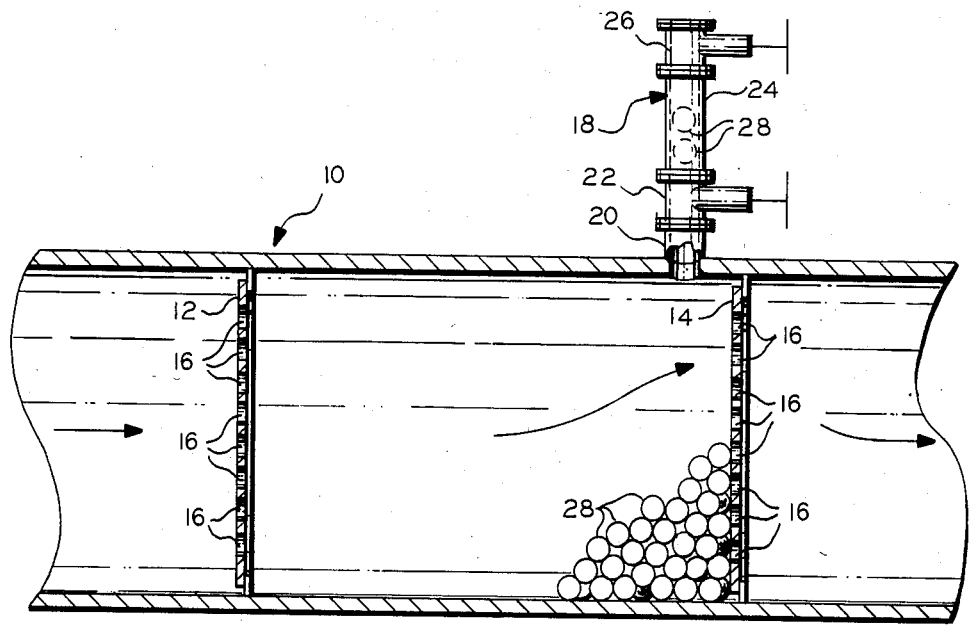
FIG. 1 is a vertical cross-sectional view of a conduit illustrating the apparatus of the present invention installed and in operation therein.

Referring now to the drawings, and to FIG. 1 in particular, a horizontal segment of conduit through which hot flue gases are flowing from left to right is generally designated by the reference character 10. The conduit 10 is provided with a pair of perforated baffles 12 and 14 extending transversely across the conduit 10. Each of the baffles 12 and 14 is provided with a plurality of perforations 16 through which the hot flue gases flow, and which provide a predetermined pressure drop across the respective perforated baffles 12 and 14 which corresponds to the flow rate of the flue gas stream through the conduit. A tubular feed chamber assembly 18 is secured to the upper portion of the conduit 10 immediately upstream of the perforated baffle 14. The assembly 10 includes a first tubular segment 20 which is fixedly secured to the conduit 10 and has a tubular passage extending therethrough and in fluid flow communication with the interior of the conduit 10. A suitable valve 22, such as a gate valve, is secured to the first tubular segment 20 with the valve passage of the valve 22 in flow communication with the vertical passage through the first tubular segment 20. A second tubular segment 24, having a vertical passage therethrough, is secured to the opposite or upper end of the valve 22 with the vertical passage through the second tubular segment 24 in flow communication of passage of the valve 22. A second suitable valve 26, such as a gate valve, is secured to the upper end of the second tubular segment 24 with the valve passage of the valve 26 in flow communication with the vertical passage of the second tubular segment 24. The second tubular segment 24 defines a chamber between the valves 22 and 26. The diameters of the vertical passages through the first and second tubular segments 20 and 24 and the diameters of the valve passages through the valves 22 and 26 are substantially equal and are of sufficient diameter to pass therethrough a generally spherically shaped object having a diameter greater than the maximum diameter of the perforations 16 in the perforated baffle 14.

The generally spherically shaped objects employed in the present invention are generally designated by the reference character 28. The objects 28 are preferably constructed of a material, such as, for example, refractory material, which can withstand prolonged exposure to a stream of gas passing thereover at a temperature of at least about 600° F. (315° C.). Such a suitable refractory material can be in the form of a generally spherically shaped molded or cast ceramic object.

Gas flow through the perforated baffle 14 is altered by the introduction of a plurality of such objects 28 into the interior of the conduit 10 with the objects 28 being disposed immediately upstream of and partially supported by the perforated baffle 14. The objects 28 can be introduced into the conduit during the flow of hot flue gases therethrough through the manipulation of the valves 22 and 26 of the tubular assembly 18. With the valve 22 in its closed position and with the valve 26 in its open position, one or more objects 28 can be inserted downwardly through the open valve 26 and the passage through the tubular assembly 18 where they are retained within the second tubular segment 24 by the closed valve 22. Upon closure of the valve 26, the valve 22 can be open, thus allowing the object or objects housed within the chamber defined by the second tubular segment 24 to fall downwardly by the action of gravity into the conduit 10. The objects can be introduced into the conduit 10 one by one, in pairs or in other combinations so as to gradually cause the erection of a pile of objects 28 in the conduit substantially blocking a portion of the perforations 16 in the lower portion of the perforated baffle 14. As the objects 28 partially block the lower perforations 16, the flow of gas through the remaining uncovered perforations 16 will increase in velocity and the pressure drop across the perforated baffle 14 will increase thus lowering the pressure of the gas downstream of the perforated baffle 14.

Figure 2:
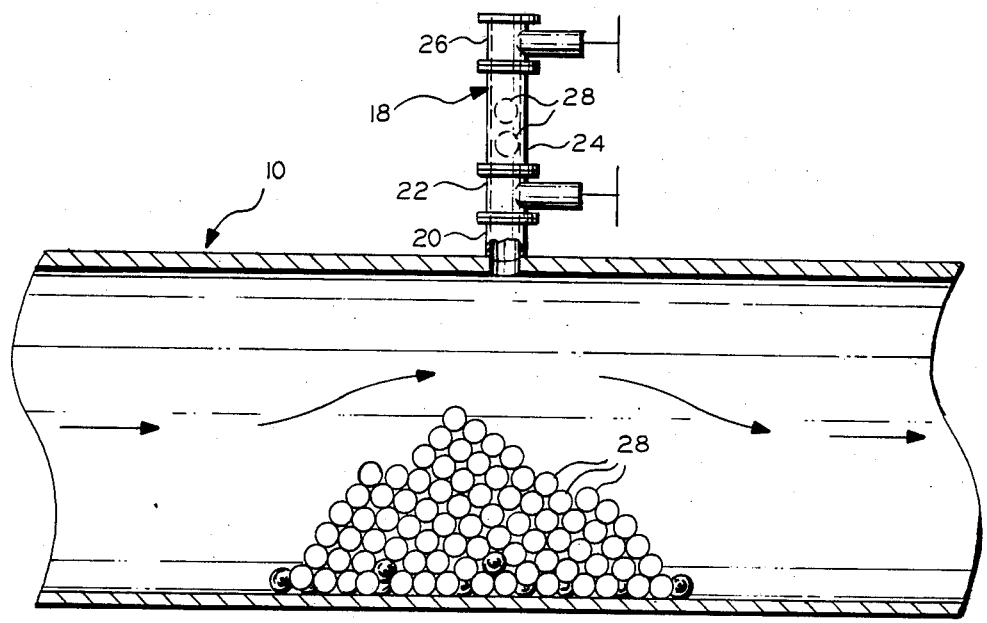
FIG. 2 is a vertical cross-sectional view of a conduit illustrating the apparatus of the present invention at a location remote from any transverse baffle in the conduit.

FIG. 2 illustrates a variation in the application of the present invention, wherein conduit 10 is without a fixed perforated baffle plate near the point where an increased pressure drop is to be obtained. The generally spherically shaped objects 28 are inserted into the conduit 10 by means of the tubular assembly 18 in the manner described above for the structure depicted in FIG 1. It is to be expected that a greater number of objects 28 will be required in the embodiment of FIG. 2 in order to achieve the desired pressure drop since a greater number of object 28 would be required to support the pile of objects from the downstream side of the pile.

Figure 3:
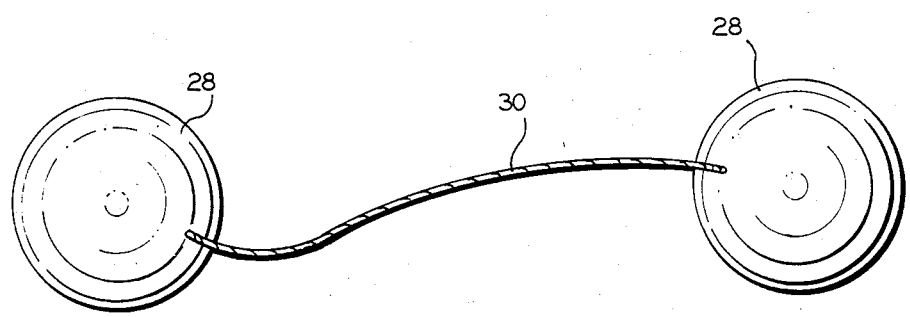
FIG. 3 illustrates one embodiment of apparatus suitable for use in the method of the present invention.

It is presently preferred to employ generally spherically shaped objects 28 in pairs, with each pair of objects 28 secured together by means of flexible connecting means such as a length of steel cable as shown at 30 in FIG. 3. As noted above, the diameter of each object 28 depends on the diameter of the perforations in a perforated baffle within a conduit if such baffle is present in the conduit. The maximum size of the objects 28 is practically limited by the passage diameters of the valves 22 and 26 and the tubular segments 20 and 24 of the tubular assembly 18 which are available. It has been found that objects having a diameter of about 5¼ inches (13.3 centimeters) can be advantageously employed with a baffle having perforations having a diameter of 4½ inches (11.4 centimeters) and will readily pass through a tubular assembly 18 having an effective inside diameter of 6 inches (15.2 centimeters).

The previously described flexible connecting means 30 which is employed to mutually interconnect a pair of objects 28 effectively prevents the objects 28 from being moved downstream through the conduit in response to the flow of gas therethrough, and further appears to provide surprising reinforcement to the piles of objects 28 deposited within the conduit 10 in spite of the force applied to the piles by the hot gases flowing therepast. While the length of the flexible connecting means 30 is not critical, it has been found such connecting means 30 having a length in the range from about 1 to about 6 times the diameter of one of the objects 28 is well suited for utilization in the practice of the present invention. It is well within the scope of the present invention to interconnect three or more objects 28 utilizing the flexible connecting means 30. Such characteristic of the structure illustrated in FIG. 3 is especially advantageous in the employment of the present invention under the conditions illustrated in FIG. 2.

From the foregoing, it will be seen that the method and apparatus of the present invention provide effective, simple and economical means for controlling the flow of hot gases, such as hot flue gases, through a conduit to achieve desired adjustment and control of pressures and velocities through the conduit while maintaining the conduit in operation in the industrial process with which it is associated.

Changes may be made in the combination and arrangement of parts or elements heretofore set forth in the specification and shown in the drawings without departing from the spirit and scope of the invention as defined in the following claims.

We claim:

1. A method of controlling the flow of a stream of gas flowing through a conduit during the flow of said gas stream through said conduit comprising disposing a plurality of pairs of generally spherically shaped objects within said conduit during the flow of said gas stream until the pressure of said gas stream downstream of said plurality of pairs of said objects is reduced to a desired value, each pair of objects being mutually secured together by a length of flexible connecting means.

2. A method in accordance with claim 1 wherein said objects are added one pair at a time to the interior of said conduit until said desired pressure value is obtained.

3. A method in accordance with claim 1 wherein said objects are disposed within said conduit upstream of a perforated baffle plate having a plurality of perforations therein and extending transversely across the interior of said conduit whereby said objects substantially restrict gas flow through a portion of said perforations to increase pressure drop across said baffle plate.

4. A method in accordance with claim 1 wherein said objects and said flexible connecting means are each made of material capable of withstanding prolonged exposure to gases at a temperature of at least about 600° F. (315 ° C.) without adversely affecting there intended function.

5. A method in accordance with claim 1 wherein said objects are formed of refractory material and said flexible connecting means comprises flexible steel cable.

6. A method in accordance with claim 1 wherein said pairs of objects are introduced into the interior of said conduit via a feed chamber having a pair of spaced apart valves interposed therein and communicating with the interior of said conduit, comprising closing said valves with at least one pair of objects to be disposed within said conduit located in said feed chamber between said closed valves, followed by opening said valve nearest the conduit to allow at least the one pair of objects located between said valves to enter the interior of said conduit under the influence of gravity.

7. A method in accordance with claim 6 characterized further to include thereafter closing said valve nearest said conduit, opening said valve remote from said conduit, disposing at least one additional pair of objects in said chamber between said valves, closing said valve remote from said conduit, and repeating the steps of claim 8.

8. A method in accordance with claim 7 wherein said steps of claim 7 are repeated until the pressure of said gas stream downstream of said plurality of said objects is reduced to said desired value.

* * * * *